March 17, 1964 G. J. MULLANEY 3,125,076
CONSTANT PRESSURE COMBUSTION AUTOIGNITION ENGINE
Filed Oct. 21, 1957 3 Sheets-Sheet 1
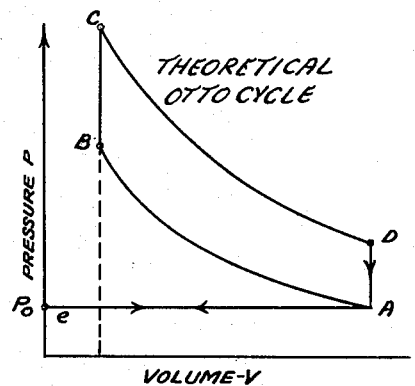
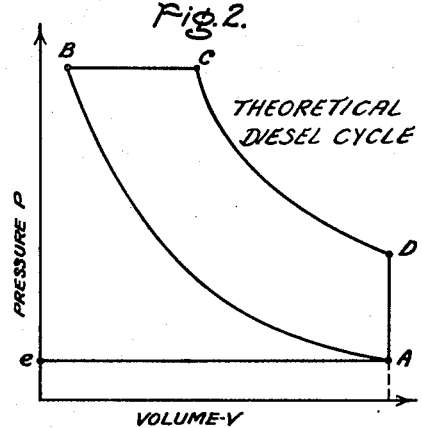
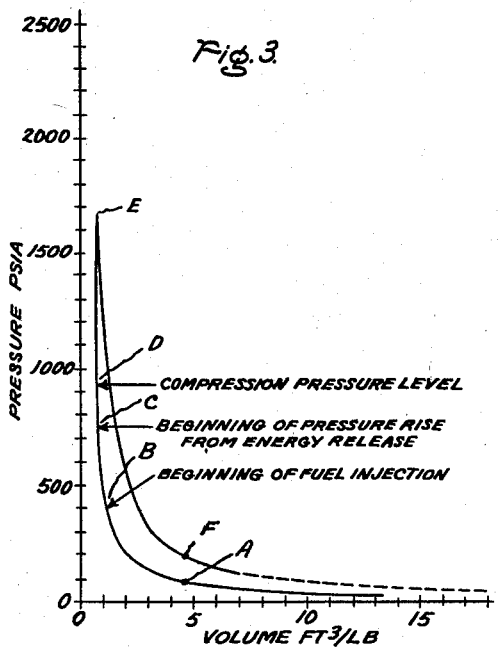
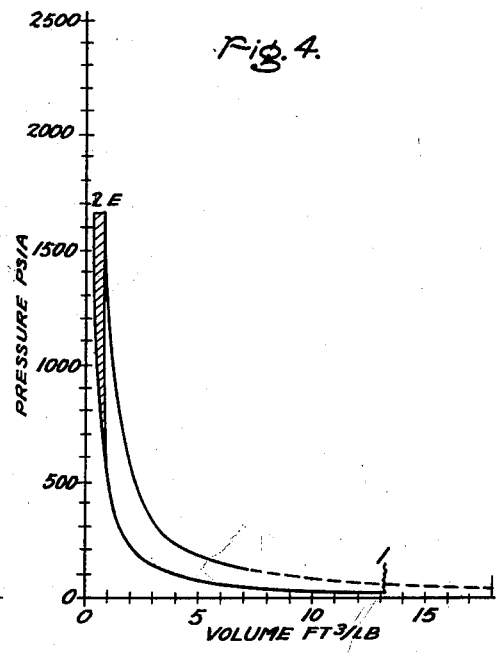
Inventor:
George J. Mullaney,
by Paul A. Frank
His Attorney.

March 17, 1964  G. J. MULLANEY  3,125,076
CONSTANT PRESSURE COMBUSTION AUTOIGNITION ENGINE
Filed Oct. 21, 1957  3 Sheets-Sheet 2
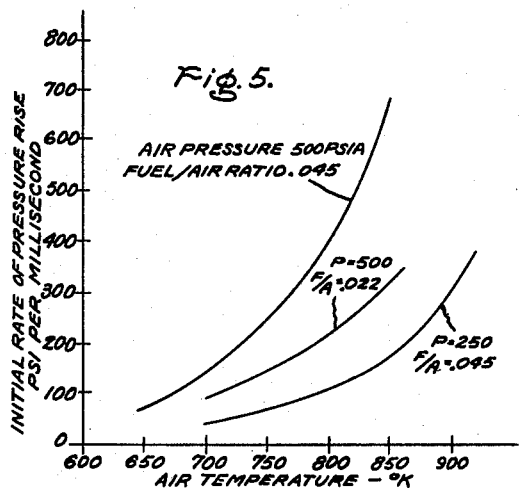
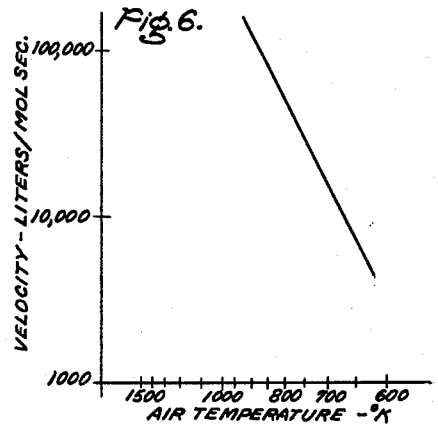
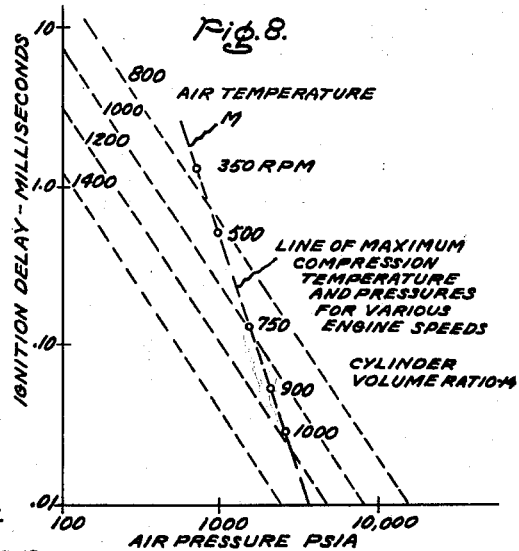
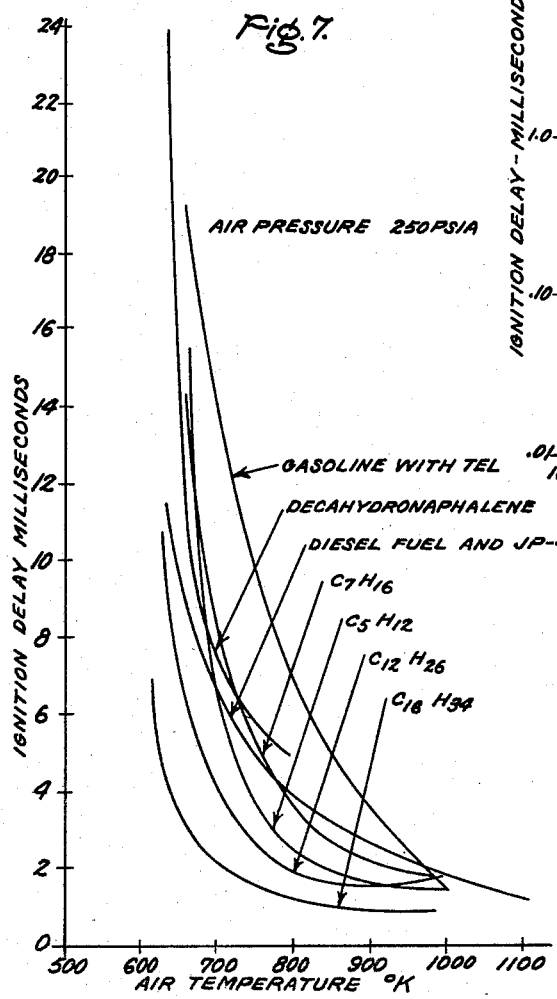
Inventor:
George J. Mullaney,
by Paul A. Frank
His Attorney.

Inventor:
George J. Mullaney,
by Paul A. Frank
His Attorney.

United States Patent Office 3,125,076
Patented Mar. 17, 1964

3,125,076
CONSTANT PRESSURE COMBUSTION AUTO-IGNITION ENGINE
George J. Mullaney, Burnt Hills, N.Y., assignor to General Electric Company, a corporation of New York
Filed Oct. 21, 1957, Ser. No. 691,358
5 Claims. (Cl. 123—32)

This invention relates to a constant pressure combustion autoignition engine, and more particularly to a method and apparatus for operating a diesel engine to approach the theoretical diesel cycle.

For the purposes of this application internal combustion engines may be categorized as spark ignition engines or an autoignition engine, and the related thermodynamic cycles are referred to as the Otto cycle and the diesel cycle respectively. In the Otto cycle or a spark ignition engine of which the automotive gasoline engine is a good example, a mixture of gasoline and air is drawn into a cylinder by the suction stroke of a piston. The mixture of gasoline and air is then compressed to a predetermined pressure and ignited by means of a spark plug or other ignition device. Upon ignition there is a very rapid temperature and pressure rise forcing the piston downward for the power stroke. In the diesel cycle only air is drawn into a cylinder by the suction stroke of the piston and the air is compressed to a predetermined pressure at which point fuel is injected into the cylinder. The compression then continues until the fuel ignites without the aid of spark ignition thus forcing the piston downwardly for the power stroke.

One of the more important differences to be noted in the operation of these two engines is that in the Otto cycle upon ignition of the fuel-air mixture by the sparking device there is a rapid temperature and pressure rise. In the diesel cycle, the controlled injection of fuel in combination with the downward motion of the piston, while permitting a rapid temperature rise, maintains a somewhat constant pressure on the piston during the power stroke. For the same maximum pressure in the two engines and equal fuel input, the diesel process is more efficient than the Otto process. However, an examination of diesel engine kinetics discloses that the combustion process closely approximates the constant volume process of the Otto cycle rather than the theoretical constant pressure process of the diesel cycle. In many applications, the diesel engine cannot be increased in power without a severe penalty in engine weight because of the adverse effect of applying a sudden shock to a highly stressed system (brisance) when the rapid burning of the fuel begins during constant volume combustion.

Accordingly, it is an object of this invention to increase the efficiency of diesel engines.

It is another object of this invention to obtain more constant pressure combustion in a diesel process.

It is another object of this invention to provide an improved fuel injection system for diesel engines.

It is another object of this invention to minimize ignition lag of fuel in a diesel engine.

Briefly stated, in accordance with one aspect of my invention, the ignition lag of diesel fuels is substantially eliminated through provision of predetermined compression pressures and temperatures and a timed fuel injection to commence at top dead center of the piston compression stroke. Thereafter, a predetermined control over the fuel injection permits constant pressure combustion and increased cycle efficiency.

While the specification concludes with claims particularly pointing out and distinctly claiming the subject matter of this invention, it is believed the invention will be better understood from the following description taken in connection with the accompanying drawings, in which:

FIG. 1 is a schematic illustration of an Otto cycle pressure-volume curve;

FIG. 2 is a schematic illustration of a diesel cycle pressure-volume curve;

FIG. 3 is a schematic illustration of a modern standard production diesel cycle pressure-volume curve;

FIG. 4 is a schematic illustration of a diesel cycle pressure-volume curve representing the increased efficiency of the embodiments of this invention;

FIG. 5 is a series of curves representing the initial rate of pressure rise versus air temperature for diesel fuel;

FIG. 6 is a curve representing the velocity constant versus the increase of temperature for diesel fuel;

FIG. 7 is a series of curves of various fuels illustrating ignition lag relative to air temperatures;

FIG. 8 is a series of curves representing ignition delay relative to various pressures with a superimposed curve representing maximum pressures and temperatures for various engine speeds;

Figure 10:
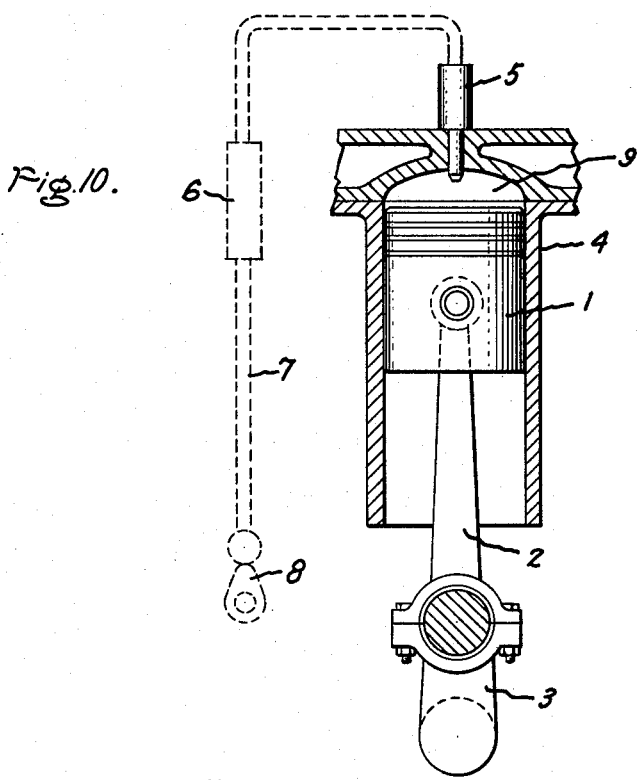
FIG. 10 is a schematic illustration of a diesel engine employing the embodiments of this invention; and FG. 11 illustrates schematically a pressure volume curve representing the cycle of a diesel engine of this invention.

The standard gasoline engine cycle known as the Otto cycle is illustrated in FIG. 1 by a pressure-volume diagram. In this diagram line AB represents the movement of a piston within a cylinder to compress a fuel-air mixture to a pressure at B. Thereafter spark ignition commences with abrupt pressure rise from point B to C. This high pressure rise forces a piston downwardly on the power stroke which is represented by lines CD.

In FIG. 2 there is schematically illustrated on the pressure-volume diagram the theoretical diesel cycle. This cycle shows compression from A to B, at which point the fuel, which has previously been injected, commences burning. Thereafter dependent upon the delivery of the fuel and movement of the piston, pressure within the cylinder is maintained constant from the point B to point C with the power stroke represented by C to D.

FIGS. 1 and 2 represent the ideal cycle of the Otto and diesel engines, but as heretofore stated, in actual practice the diesel cycle more closely approximates that of the Otto cycle. For example, tests upon the standard production diesel engine employing the accepted practice of precompressing or supercharging disclose a pressure volume diagram as illustrated in FIG. 3.

In this diagram, the compression stroke (after supercharging) is shown as A to D, and as the piston moves on the compression stroke, fuel is injected considerably before top dead center at a compression pressure of about 400 p.s.i. As the compression continues, the fuel begins to ignite at approximately 750 p.s.i., point C. At this point C there is an attendant abrupt rise in pressure to approximately 1700 p.s.i., point E, after which the piston commences the power stroke at point E to F. It will be noted that such a pressure-volume diagram for the production diesel engine closely approximates the pressure-volume diagram for the Otto ignition in FIG. 1. Since the work output of these engines may be calculated from the area included within the curves in the various diagrams, it may be seen that if the curve of FIG. 3 (the standard production engine) approached the theoretical diesel cycle of FIG. 2, a greater efficiency and work output may be had.

For the purposes of illustration reference is made to FIG. 4 where the pressure-volume diagram for the standard production diesel engine in FIG. 3 is reproduced. The theoretical cycle as imposed upon the standard production engine cycle is shown by the curve 1, 2, E, 1, and particularly by the compression 1 and 2 and by the constant pressure line 2 to E with peak cycle pressure at 2 obtained without combustion. By a comparison of the shaded area included under the curve 1, 2, E, 1 with that under curve 1, E, 1, it may be seen that the theoretical cycle shows a marked increase in work output and efficiency over that of a standard engine which at the present time is operating on a cycle closely approximating that of the Otto engine. Proper control of such features as ignition lag and fuel injection are necessary to achieve the proposed theoretical cycle as illustrated in the pressure-volume diagram of FIG. 4.

The various features contributing to the pressure-volume diagram of the standard production diesel engine evolve from sound engineering practices. Fuel is injected into the cylinder (point B in FIG. 3), at approximately 400 pounds pressure in order that the fuel may become well mixed with the air before point C is reached, and at point C ignition of the compressed fuel-air mixture takes place. The distance between points B and C is known as ignition lag which is a characteristic of most known fuels and may be described as that period of time from the beginning of fuel injection until rapid chemical reaction has commenced.

The initial rate of pressure rise for the combustion reaction (after ignition lag) point C to point D in FIG. 3 varies with initial air temperature, pressure, and fuel/air ratio as shown in FIG. 5. It has been determined that the initial rate of pressure rise following the ignition lag of a hydrocarbon (such as diesel fuel-air mixture) is given by:

$$\frac{dp}{dt} = \frac{kp^2}{RT^2} N_o \frac{dT}{dN_f} \quad \text{(atmospheres/sec.)}$$

where $k$ = the velocity constant for the bimolecular reaction $p$ = air pressure at beginning of rapid reaction, atmospheres $R$ = gas constant $\frac{\text{liter} \times \text{atmospheres}}{\text{degree-mol}}$ $T$ = initial air temperature, °K.

$N_o$ = moles of oxygen per total mole fuel and air $\frac{dT}{dN_f}$ = temperature rise per mole of fuel reacted This equation is derived from a fundamental equation of reaction kinetics assuming a homogeneous bimolecular reaction and starting with a velocity equation of the second order. (See W. Jost, "Explosion and Combustion Processes in Gases," McGraw-Hill Book Company, pages 245–246.)

For the initial state of the reaction:

$$-\frac{dA}{dt} = k[A][O]$$

$\frac{dA}{dt}$ = rate of change of fuel concentration $= \frac{\text{mols}}{\text{liter}} \frac{1}{\text{sec.}}$ $[A]$ = fuel concentration—mols/liter $[O]$ = oxygen concentration—mols/liter $k$ = velocity "constant" $\frac{1}{\frac{\text{mol}}{\text{liter}} \cdot \text{sec.}}$ The derivation of the equation proceeds as follows:

$$-\frac{dA}{dt} = -\frac{dA}{dT} \times \frac{dT}{dt}$$

$$p = \rho RT$$

$\rho$ = gas density—mols/liter $R$ = gas constant— $\frac{\text{liter atmosphere}}{\text{deg-mol}}$ = .082 (Handbook Chem. Physics 38th Ed., p. 2945)

$T$ = temperature—°Kelvin $t$ = time—seconds $N_a$ = mols fuel per mol air plus fuel = $\frac{n_a}{n_t}$ $N_o$ = mols oxygen per mol air plus fuel = $\frac{n_o}{n_t}$ $$-\frac{dA}{dt} = \frac{P}{RT} \frac{dN_a}{dT} \times \frac{dT}{dt}$$

$$\frac{dp}{dt} = \rho R \frac{dT}{dt}$$

$$-\frac{dA}{dt} = \frac{P}{RT} \frac{dN_a}{dT} \frac{1}{\rho R} \frac{dp}{dt}$$

$$-\frac{dA}{dt} = k[A][O]$$

$$\frac{dp}{dt} = \frac{R^2 T \rho dT}{p dN} k[A][O]$$

$$[A] = \left[\frac{pN_a}{RT}\right]^a \text{ and } [O] = \left[\frac{pN_o}{RT}\right]$$

$$\frac{dp}{dt} = \frac{R^2 T p}{RT} \frac{1}{p} \frac{dT}{dn_a} k \frac{pN_a}{RT} \frac{pN_o}{RT} n_t$$

$$\frac{dp}{dt} = k \frac{P^2}{T^2} \frac{dT}{dn_a} \frac{1}{R} n_t N_a N_o$$

A numerical value was substituted for the differential temperature rise $dT$ based on one mol of fuel $$\therefore n_t \times N_a = 1$$

As noted in Jost (p. 246) the velocity of reaction expressed by $k$ is usually dependent on temperature. In fact it is fairly common to attempt to correlate complex reaction data by assuming that the overall reaction can be simulated by $$k = AE^{-E/RT}$$

$A$ = a constant
$E$ = activation energy

Since the initial rate of pressure rise varies as the square of the pressure the instant an increment of fuel is burned, and since the velocity constant $k$ increases logarithmically with temperature at that time (FIG. 6), adding a large percentage of the fuel required per cycle considerably before top dead center (because of ignition lag) will always cause the very rapid and abrupt temperature and pressure rise mentioned above.

This abrupt rise in pressure and temperature produces an impact on the piston, thereby contributing to the wear of pistons ring, cylinder walls, bearings, and sometimes causes piston failures. Accordingly, it may be seen by this description that if ignition lag could be reduced to substantially zero, fuel may then be injected at the top dead center of the piston stroke and, if injected according to a predetermined fuel flow rate, provides a constant pressure combustion with maximum pressure substantially equal to compression. This increases the efficiency of the diesel engine cycle, and furthermore, minimizes the impact effect of the abrupt temperature and pressure rise associated with injecting of the fuel during the compression stroke of the piston.

The ignition delay depends on both air pressure and temperature and is generally given by the formula:

$$\tau = A p^{n_o} C/T$$

where $\tau$ = ignition delay
$p$ = air pressure
$T$ = air temperature

A, n, and C are constants which are characteristics of the fuel air mixture and include the overall effects encountered in the chemistry of combustion. The state of the art is such that the detailed processes of low temperature reactive kinetics which occur during ignition lag or generally unknown. Since the ignition delay time is reduced as the pressure rises, the constant n has a negative value.

A further description and clarification of the above-mentioned formula is contained in "Chemical Kinetics and Chain Reactions," Semencoff, Oxford Press, London, 1935. This formula is empirical and expresses the overall ignition delay reaction.

In order to inject fuel at the top dead center of a compression stroke, the pressure and temperature at top dead center must be carefully predetermined. FIG. 7 represents an illustration of the ignition delay versus air temperature for several well known fuels. These curves indicate a general convergence at the higher temperatures showing that, between approximately 1,000 and 1,200° Kelvin temperature, the ignition delay is on the order of 1 millisecond or less.

FIG. 8 represents ignition delay versus air pressure for diesel fuel at several pressures. Superimposed upon the air temperature curves is a line M which represents the maximum compression temperatures and pressures for engines at various speeds. Accordingly, a high speed engine operating at about 1,000 r.p.m. with a cylinder pressure and temperature of approximately 2400 p.s.i. and 1,200° Kelvin respectively, provides an ideal condition for constant pressure combustion. For low engine speeds such as idling speeds and the like, the pressure-temperature conditions are lower than required. For example, it will be noted that at approximately 750 r.p.m., the pressure and temperature are approximately 1500 p.s.i. and 1,000° Kelvin respectively. While these conditions do not approach the optimum conditions for minimum ignition delay, it will be observed that idling speeds may be increased to overcome this problem, or that at idling speeds, fuel injection may be further controlled to provide idling operation in conformance to present diesel practices.

Having established the optimum conditions for substantially minimizing the ignition delay, the fuel flow must be selected to provide the proper constant pressure combustion. During the interval while fuel is added, the combustion temperature will depend on the amount of fuel injected up to the instant being considered. Since final combustion temperature is nearly proportional to the amount of fuel supplied, the fuel flow delivery rate for constant combustion pressure should follow the combustion volume versus time curve resulting from engine geometry and speed.

Figure 9:
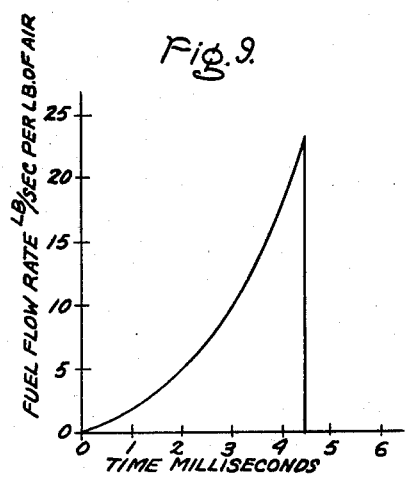
FIG. 9 is a curve showing the flow rate fuel injected versus the time of injection.

FIG. 9 shows the flow of fuel per pound of air versus the time for the assumed engine during the fuel injection period. The fuel flow rate is proportional to this curve for constant pressure combustion, and ideally, has a slowly rising characteristic, concave upwardly, with a sharp cut-off at the end of the fuel cycle.

FIG. 10 schematically illustrates one embodiment of this invention wherein a piston 1 is connected by means of a connecting rod 2 to a crank shaft 3 and rotation of the crank shaft 3 causes reciprocating motion of the piston 1 within the cylinder 4. Fuel is introduced through the cylinder by means of a fuel nozzle 5 connected to a control member 6 which is actuated by a suitable push-rod 7 and a cam shaft 8. According to the features as set forth in this invention, the peak compression in the compression chamber 8 entails a pressure and temperature high enough to provide essentially zero ignition lag for the fuel-air combination and engine speed employed. The piston 1, as illustrated, is at top dead center at which time the fuel injection has commenced. The fuel nozzle and its control incorporates a fuel flow time characteristic which is correlated with the air-fuel ratio, compression pressure and temperature, and engine speed according to the fuel curve shown in FIG. 9. The combination of peak pressure and fuel control or schedule as described limits the maximum pressure in the cycle to substantially that attained at peak compression pressure. Such an arrangement as illustrated, provides a diesel engine of greater efficiency than present commercial diesel engines which operate on a cycle more similar to the Otto cycle than to the diesel cycle. As compared to an Otto engine, for the same maximum pressure and heat input, the constant pressure diesel process is more efficient than the Otto process. Additionally, the constant combustion pressure process substantially eliminates the abrupt high pressure and temperature rise associated with ignition lag to minimize the injurious effects of such a rise upon the rings, bearings, and other related parts of the engine.

Figure 11:
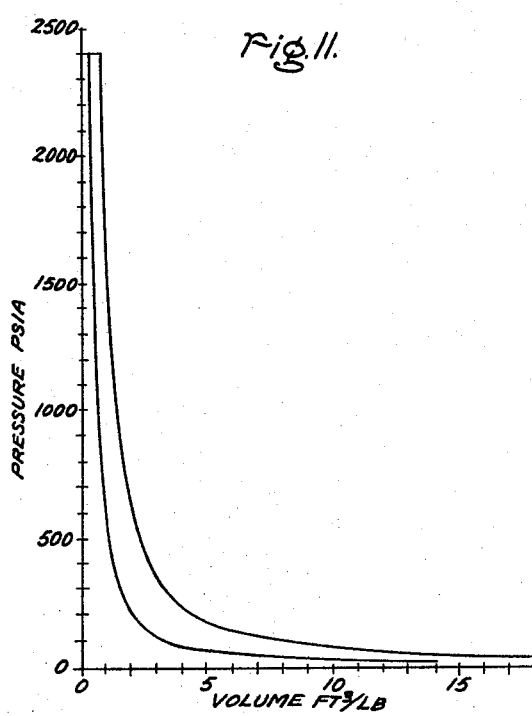

In FIG. 11 there is illustrated schematically the pressure volume curve of an exemplary diesel engine conforming to this invention. This engine utilizes a volume ratio or compression ratio of 42:1 in order to achieve the required pressure and temperature for substantially 0 time ignition lag. In this example the peak pressure is 2400 p.s.i. and the corresponding temperature, 1200° K. Alternatively, the peak pressure may be achieved by means of a supercharger with a volume ratio of 3:1 and reducing the engine volume ratio to approximately 14:1. Overall volume ratio of the engine is the total ratio required to produce the desired temperatures and pressures, i.e., the ratio of the engine and also the inlet conditions such as where a supercharger is employed as described. This engine by its pressure volume cycle indicates approximately a 10% increase in efficiency and work output over a comparative Otto cycle engine having the same pressures and temperature together with an equal amount of fuel.

This invention is not restricted in its application to the crank shaft type diesel engine of the two or four cycle variety, but it is also applicable to free piston engines operating on the diesel cycle to obtain the same increase in efficiency and related optimum performances, whether or not employing liquid or gaseous fuels.

While other modifications of this invention and variations of apparatus which may be employed in the scope of the invention have not been described, the invention is intended to include all such as may be embraced within the following claims.

What I claim as new and desire to secure by Letters Patent of the United States is:

1. A method of operating a diesel engine which comprises, establishing compression, pressure, and temperature in said engine to reduce ignition lag of a predetermined fuel to substantially zero, introducing the said fuel into the engine beginning at top dead center of the piston on compression stroke, and maintaining fuel injection in a quantity versus time ratio commencing at 0 with a smooth upwardly substantially concave curve and a sharp cutoff to produce a substantially constant pressure combustion only.

2. The method of operating a diesel engine for constant pressure combustion which comprises, establishing an overall volume ratio about 42 to 1 to produce a corresponding pressure and temperature about 2400 p.s.i. and 1200 K. respectively, utilizing a predetermined fuel having a substantially zero time ignition lag at said established pressure and temperature, commencing the introduction of said fuel at top dead center of piston travel on compression stroke, and continuing the introduction of fuel during the power stroke at a fuel flow ratio proportional to the changing volume of the cylinder wherein the piston is moving on power stroke in a quantity versus time ratio commencing at zero with a smooth upwardly substantially concave curve and a sharp cutoff whereby the constant pressure process only is obtained, and limiting the said constant pressure to that corresponding to said volume ratio.

3. A diesel type internal combustion engine for operation on predetermined fuels comprising in combination, a cylinder, a piston in said cylinder adapted for reciprocal movement therein, the compression ratio of said piston and cylinders in conjunction with an air inlet pressure being sufficient to reduce the ignition lag of the predetermined fuels to essentially zero time, means to introduce fuel into said engine at the top dead center of piston travel on the compression stroke, and means to maintain fuel injection into said cylinder in accordance with changing volume and time, and limiting the rate of fuel injection in a quantity versus time ratio commencing at zero with a smooth upwardly substantially concave curve and a sharp cutoff for constant pressure combustion, the said pressure being limited to that obtained prior to combustion.

4. The invention as claimed in claim 3 wherein said fuel injection flow rate is proportional to the change in volume of the cylinder as evidenced by the piston moving on its power stroke with a fuel versus time rate of injection curve commencing at 0 and curving concave upwardly with a sharp cutoff.

5. A diesel type internal combustion engine for operation on predetermined fuels, comprising in combination, a cylinder, a piston adapted for reciprocating movement within said cylinder, supercharging means to introduce compressed air into said cylinder, piston means to increase the compression of said compressed air, the total compression pressure and temperature being sufficient to reduce the ignition lag of said fuels to essentially zero, means to introduce said fuel into the said cylinder at the top dead center of the piston travel on compression stroke, control means to introduce the said fuel in accordance with a fuel flow rate which is proportional to the changing volume of the said cylinder when the said piston moves through its power stroke, said means to introduce said fuel maintaining a constant pressure in said power stroke while permitting a rise in temperature, said constant pressure being limited by fuel injection in a quantity versus time ratio commencing at zero with a smooth upwardly substantially concave curve and a sharp cutoff to substantially that pressure obtained by piston compression.

References Cited in the file of this patent

UNITED STATES PATENTS

| | | |
|---|---|---|
| 542,846 | Diesel | July 18, 1895 |
| 2,012,086 | Mock | Aug. 20, 1935 |
| 2,531,493 | Appel | Nov. 28, 1950 |
| 2,583,499 | Teegen | Jan. 22, 1952 |
| 2,917,031 | Nestorovic | Dec. 15, 1959 |

OTHER REFERENCES

Engineering, Dec. 4, 1931, pages 687, 688, 689, 704, 705, 706.

Engineering, Dec. 11, 1931, pages 736, 737.

High Speed Diesel Engines, by Judge (received in the Scientific Library, Apr. 25, 1957), 5th Edition, 1957, Chapman and Hall Ltd., London.

High Speed Diesel Engines by Heldt, 6th Edition, 1950, P. M. Heldt, New York.

Diesel Engine Principles and Practice, edited by C. C. Pounder, Philosophical Library Inc., New York 16, N.Y. 1955, copy in Scientific Library.